(12) United States Patent
Fukuoka (10) Patent No.: US 11,703,741 B2
(45) Date of Patent: Jul. 18, 2023

(54) SHUTTER DEVICE AND IMAGING APPARATUS

(71) Applicant: CANON KABUSHIKI KAISHA, Tokyo (JP)

(72) Inventor: Ryusei Fukuoka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/851,625

(22) Filed: Jun. 28, 2022

(65) Prior Publication Data

US 2022/0413358 A1 Dec. 29, 2022

(30) Foreign Application Priority Data

Jun. 29, 2021 (JP) .................................. 2021-108060
Jun. 29, 2021 (JP) .................................. 2021-108061

(51) Int. Cl.
 *G03B 7/26* (2021.01)
 *G03B 9/36* (2021.01)
(52) U.S. Cl.
 CPC ................. *G03B 7/26* (2013.01); *G03B 9/36* (2013.01)
(58) Field of Classification Search
 CPC ..................................... G03B 9/36; G03B 7/26
 See application file for complete search history.

(56) References Cited

U.S. PATENT DOCUMENTS

| | | | | |
|---|---|---|---|---|
| 4,975,725 A | * | 12/1990 | Morisawa | G03B 3/10 |
| | | | | 396/132 |
| 10,564,515 B2 | * | 2/2020 | Shikama | G03B 9/14 |
| 2014/0078374 A1 | * | 3/2014 | Matsumoto | G03B 9/26 |
| | | | | 348/335 |
| 2016/0266469 A1 | * | 9/2016 | Niwamae | G03B 9/60 |
| 2019/0004398 A1 | * | 1/2019 | Ishibiki | G03B 9/10 |
| 2019/0199903 A1 | * | 6/2019 | Imai | G03B 19/12 |
| 2020/0201142 A1 | * | 6/2020 | Adachi | G03B 9/42 |

FOREIGN PATENT DOCUMENTS

| | | |
|---|---|---|
| JP | 2019061127 A | 4/2019 |
| WO | WO-2018181879 A1 * | 10/2018 ............... G03B 9/36 |

\* cited by examiner

*Primary Examiner* — Clayton E. LaBalle
*Assistant Examiner* — Diana Hancock
(74) *Attorney, Agent, or Firm* — Canon U.S.A., Inc. I.P. Division

(57) ABSTRACT

A shutter device includes a base plate including an opening, a blade unit configured to switch a state of the opening, a driving member configured to drive the blade unit, a motor, a decelerator configured to decelerate power from the motor, a first connector engaged with the decelerator, a second connector having one end attached to the driving member and another attached to the first connector, a first position detector configured to detect passage through a predetermined position in a moving locus of the driving member or the first connector, and a second position detector configured to detect a relative difference from the first position detector. The blade unit switches the state of the opening from the closed state to the opened state by continuous rotation of the first connector. Driving of the motor is controlled based on results of the detection by the first and second position detectors.

10 Claims, 6 Drawing Sheets

SHUTTER DEVICE AND IMAGING APPARATUS

BACKGROUND

Field of the Disclosure

The present disclosure relates to a shutter device, and to an imaging apparatus including the shutter device.

Description of the Related Art

A known existing shutter device is configured such that a driving spring is wound up by driving force of a motor or the like, that a wound state of the driving spring is retained by an electromagnet or the like, and that a blade included in a shutter is caused to run by force of the driving spring derived from release of the retained wound state.

For example, Japanese Patent Application Laid-Open No. 2019-61127 discusses an imaging apparatus configured to convert driving force of a motor into reciprocation of a driving lever with a leverage crank mechanism and to wind up a driving spring by the reciprocation, so that a blade runs.

SUMMARY

According to an aspect of the present disclosure, a shutter device includes a base plate including an opening, a blade unit configured to switch a state of the opening between a closed state and an opened state, a driving member attached to the blade unit and configured to drive the blade unit, a motor, a decelerator configured to decelerate power from the motor, a first connector engaged with the decelerator, a second connector having one end attached to the driving member and another end attached to the first connector, a first position detector configured to detect passage through a predetermined position in a moving locus of the driving member or the first connector, and a second position detector configured to detect a relative difference from the first position detector, wherein the blade unit switches the state of the opening from the closed state to the opened state by continuous rotation of the first connector in a first direction, and wherein driving of the motor is controlled based on results of the detection by the first position detector and the second position detector.

Further features of the present disclosure will become apparent from the following description of exemplary embodiments with reference to the attached drawings.

DESCRIPTION OF THE EMBODIMENTS

Figure 1A:
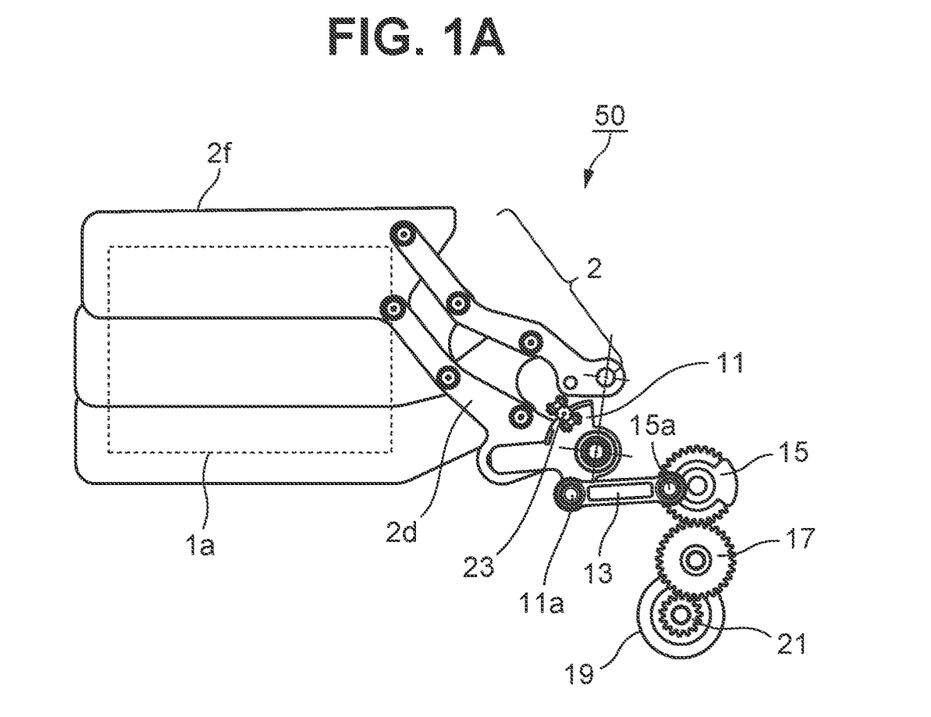
FIGS. 1A and 1B are diagrams illustrating a blade and a driving unit of a shutter device according to a first exemplary embodiment of the present disclosure.
Figure 1B:
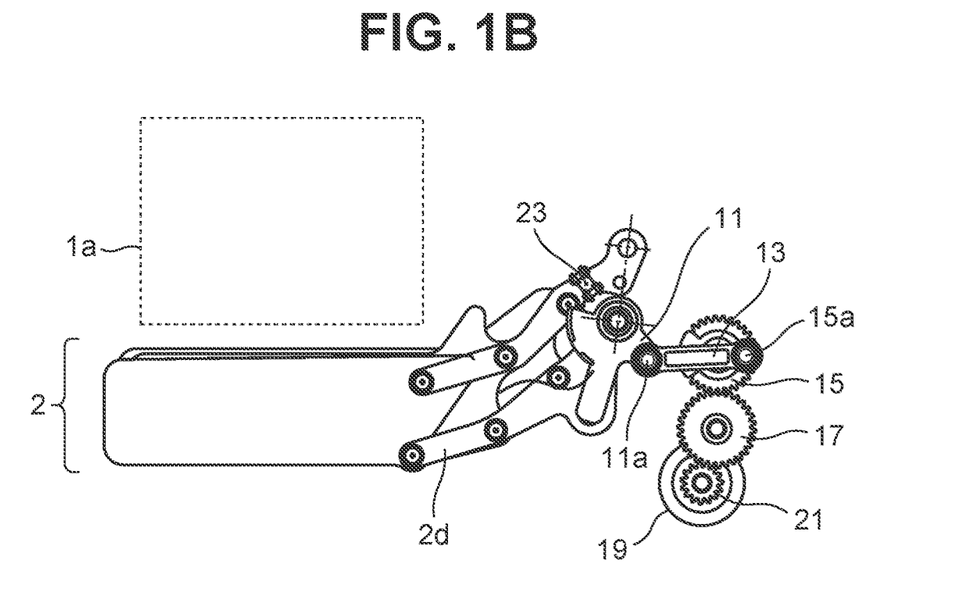
Figure 2:
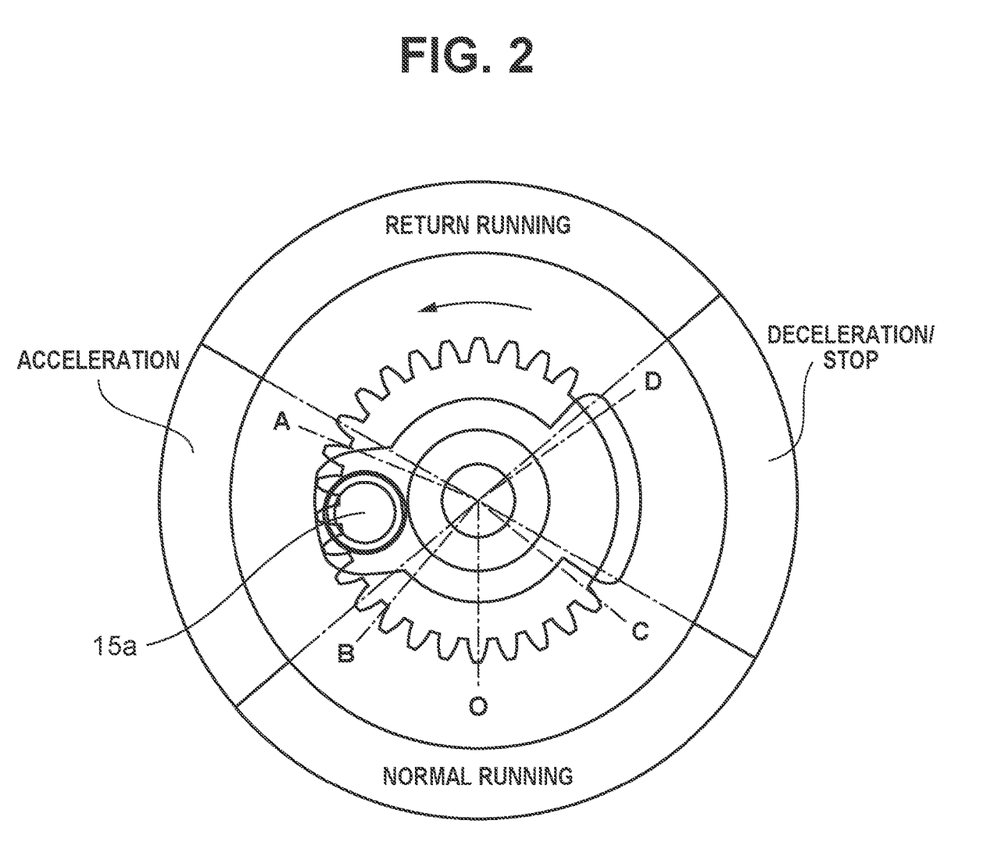
FIG. 2 is a diagram illustrating relationship between an angle of a crankshaft of a crank plate and each of phases in blade running according to the first exemplary embodiment of the present disclosure.
Figure 3:
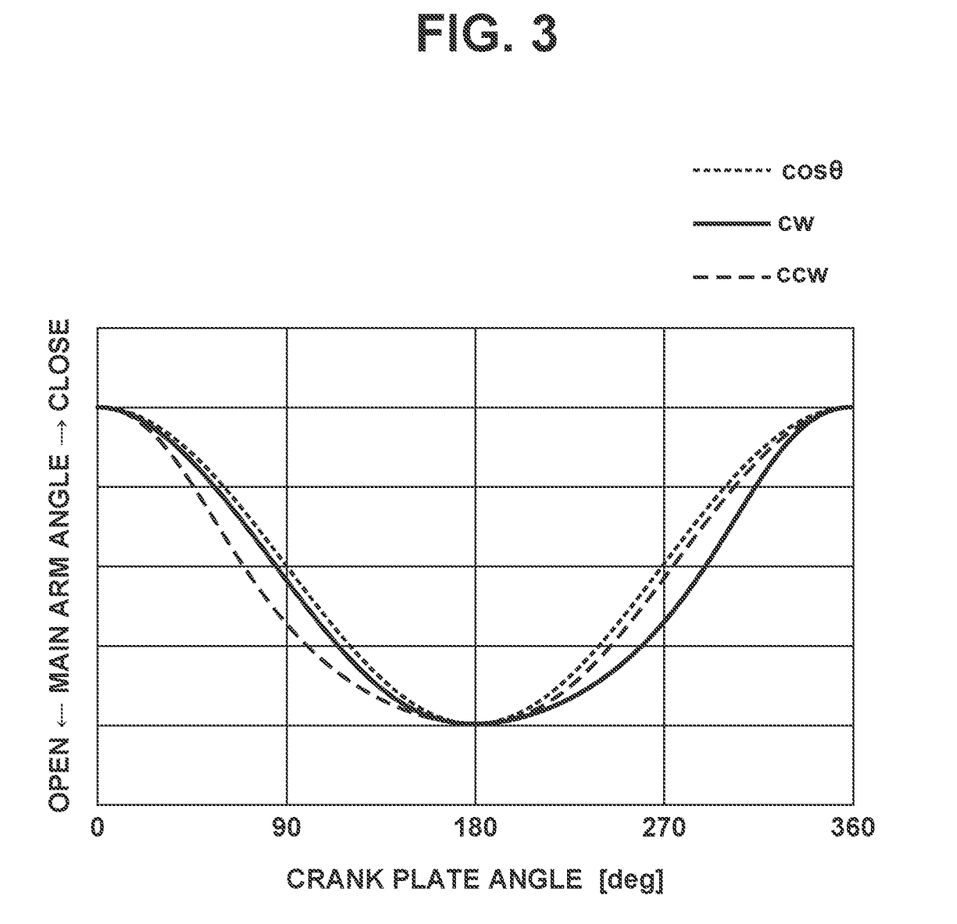
FIG. 3 is a graph illustrating relative angle relationship between the crank plate and a main arm of the blade.
Figure 4:
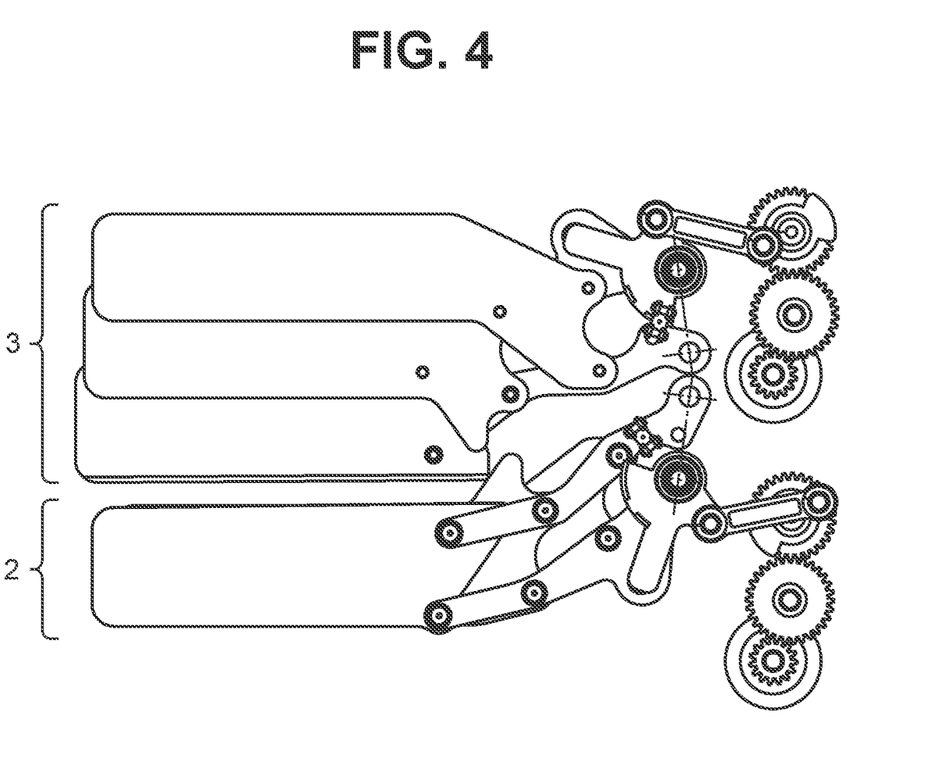
FIG. 4 is a diagram illustrating the shutter device including both of a front curtain and a rear curtain according to the first exemplary embodiment of the present disclosure.
Figure 5A:
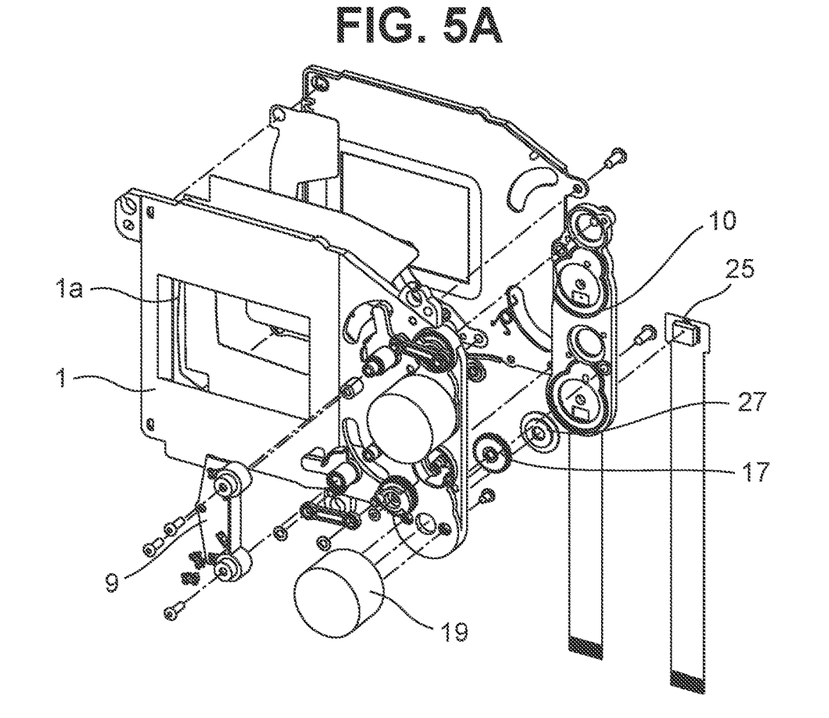
FIGS. 5A and 5B are exploded perspective views of the shutter device according to the first exemplary embodiment of the present disclosure.
Figure 5B:
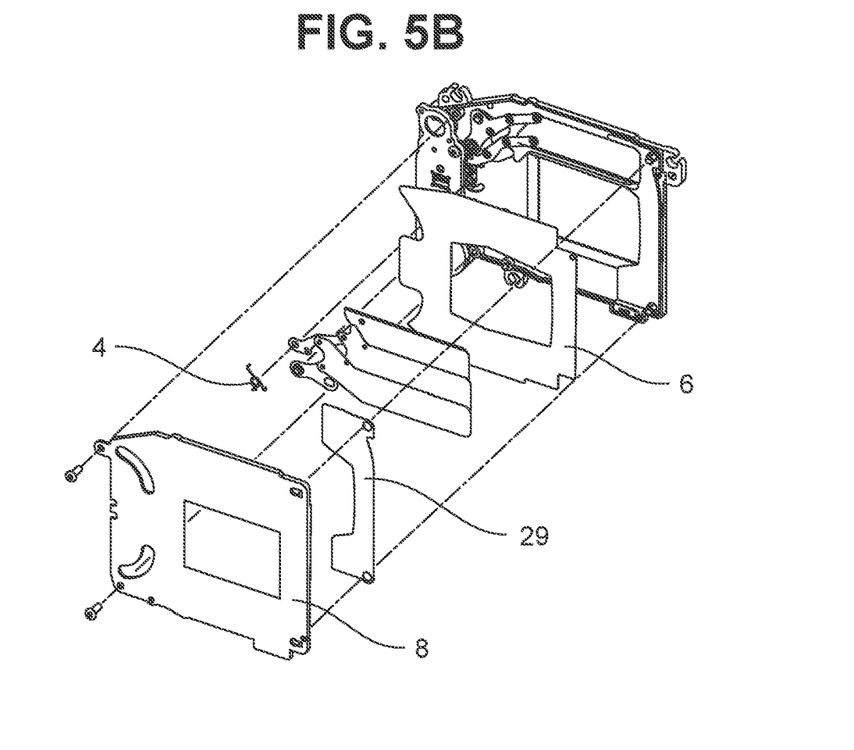

Preferred exemplary embodiments of the present disclosure are described in detail with reference to accompanying drawings. FIGS. 1A and 1B are diagrams illustrating a blade and a driving unit of a shutter device 50. FIG. 2 is a diagram illustrating relationship between an angle of a crankshaft of a crank plate 15 and each of phases in blade running FIG. 3 is a graph illustrating relative angle relationship between the crank plate 15 and a main arm 2d of the blade. FIG. 4 is a diagram illustrating the shutter device including both of a front curtain and a rear curtain according. FIGS. 5A and 5B are exploded perspective views of the shutter device 50. The shutter device 50 is disposed inside an imaging apparatus 100, and can close and open an exposure opening (hereinafter, simply referred to as opening) 1a provided in a base plate 1 of the shutter device 50 in order to adjust an exposure state of an imaging device (not illustrated) provided in the imaging apparatus 100. The shutter device 50 includes the base plate 1, a partition plate 6, a blade unit 2, a spacer 29, and a cover plate 8 that are disposed in order in an optical axis direction.

The shutter device 50 according to the first exemplary embodiment of the present disclosure is described with reference to FIG. 1A to FIG. 5B.

Driving force of a motor 19 is transmitted to the crank plate 15 directly or through a gear train.

In the present exemplary embodiment, a motor pinion 21 and an idle gear 17 (decelerator) are interposed between the motor 19 and the crank plate 15. However, the motor 19 may directly drive the crank plate 15. A driving member 11 is a connector attached so as to be integrally rotatable with the main arm 2d. A dowel portion 11a, disposed at a position offset from the rotation center, and one of the ends of a connecting rod 13 are rotatably attached to the connector 11. The other end of the connecting rod 13 is rotatably attached to a crankshaft 15a of the crank plate 15. The driving parts driving the above-described blade unit 2 are positioned by a first holder member and a second holder member 10.

FIG. 1A illustrates a state where the blade unit 2 is unfolded, and FIG. 1B illustrates a state where the blade unit 2 is folded (retracted). The driving member 11 performs a leverage operation with the two states as maximum displacement points. In this case, the driving member 11 reciprocates like a seesaw with the dowel portion 11a connected to the connecting rod 13 as a point of effort, to change the state of the blade unit 2. The crank plate 15 is configured such that the positions of the crankshaft 15a corresponding to the above-described maximum displacement points of the driving member 11 are rotationally symmetrical by 180 degrees to each other. The mechanism elements described above are referred to as a leverage crank mechanism in the present exemplary embodiment.

The shutter device 50 according to the present exemplary embodiment does not include a driving spring nor a suction holder that might function as a main driving member in a blade running in an existing shutter device. The driving member 11 is urged to be positioned at a predetermined position by an anti-backlash spring 4. However, the anti-backlash spring 4 does not apply driving force for the blade running to the driving member 11.

The shutter device 50 according to the present exemplary embodiment includes a first position detector 23 detecting one point on a motion locus of the driving member 11, and a second position detector 25 that can detect a moving angle (rotation angle) of the motor 19. In this respect, the shutter device 50 according to the present exemplary embodiment is different from the existing shutter.

In the shutter device 50, a reference position for driving of the driving member 11 can be determined based on a result of the detection by the first position detector 23, and a moving amount from the reference position is determined based on a result of the detection by the second position detector 25. As illustrated in FIGS. 1A and 1B, it is desirable that the first position detector 23 is arranged so as to avoid vicinities of both ends on the motion locus of the driving member 11. This is because, in the vicinities of both ends, change in rotation angle of the driving member 11 is small relative to change in rotation angle of the crank plate 15, and a large error may occur on the positional detection due to slight displacement and distortion of the driving member 11 or the first position detector 23. The second position detector 25 illustrated in FIG. 5A emits a periodic pulse signal n times per one rotation by using, for example, a slit disk 27 described below attached to the motor 19, and also functions as a speed detector because the second position detector 25 is configured as above. Due to the configuration as described above, the motor 19 is driven so that a slit formed portion 2f of the blade unit 2 can be moved and the slit formed portion 2f can be stopped at an optional position.

A running speed of the slit formed portion 2f can be arbitrarily controlled by adjusting the output of the motor. The driving control of the shutter device 50 may be realized when a control unit (e.g., central processing unit (CPU) not illustrated) provided inside the imaging apparatus 100 executes a predetermined program stored in a memory (not illustrated).

In the leverage crank mechanism, the blade unit 2 is reciprocated once while the crank plate 15 rotates once. In other words, when the crank plate 15 rotates once, the series of operations from normal running (blade running to acquire captured image) to return running (operation in which the blade moves from a state where the blade closes the opening to a state where the blade opens the opening after normal running) during exposure is completed. The positional relation of the slit formed portion 2f to an angular position of the crankshaft 15a of the crank plate 15 is as illustrated in FIG. 1A. A section where the slit formed portion 2f of the blade does not appear at the opening 1a as the exposure opening can be used for acceleration and deceleration.

The blade unit 2 can be reciprocated irrespective of the rotation direction of the crank plate 15. However, the relationship between the rotation angle of the crank plate 15 and the rotation angle of the main arm 2d of the blade unit 2 is changed depending on the rotation direction. This is because, for example, unlike a slider crank mechanism, a driven side (i.e., blade unit 2 side) driven by the leverage crank mechanism does not draw a linear orbit but an arc orbit.

FIG. 3 is a graph illustrating rotation angle relationship between the crank plate 15 and the main arm 2d when the crank plate 15 rotates. A solid line in the graph indicates a moving locus cw of the main arm 2d in a case where the crank plate 15 rotates in a clockwise (cw) direction from the state illustrated in FIG. 1A. A dashed line in the graph indicates a moving locus ccw of the main arm 2d in a case where the crank plate 15 rotates in a counterclockwise (ccw) direction from the state illustrated in FIG. 1A. A dotted line in the graph indicates an ideal cosine curve. In a case where the crank plate 15 continuously rotates in one direction, the rotation direction of the main arm 2d is periodically switched between the cw direction and the ccw direction.

As illustrated in FIG. 3, in a section where the rotation direction of the main arm 2d is coincident with the rotation direction of the crank plate 15, the main arm 2d draws a locus close to the ideal cosine curve. In contrast, in a case where the rotation direction of the main arm 2d is opposite to the rotation direction of the crank plate 15, the moving locus of the main arm 2d is largely deviated from the ideal cosine curve. In other words, as the blade running curve, while the crank plate 15 rotates once, the locus alternates between being close to the ideal cosine curve and largely deviating from the ideal cosine curve. The former locus is close to a straight line, and the locus has symmetricity between a front half and a rear half of the rotation of the crank plate 15. For this reason, the locus is suitable for the running curve during main exposure using the blade unit 2. Since the locus is close to a straight line, adjustment is easily performed in a case where the motor is intentionally accelerated or decelerated to shape the running curve of the blade unit 2.

As described above, control is preferably performed such that the rotation direction of the main arm 2d and the rotation direction of the crank plate 15 are coincident with each other in the blade running of the blade unit 2 during exposure. In other words, the section where the rotation direction of the main arm 2d of the blade unit 2 and the rotation direction of the crank plate 15 are coincident with each other is used as a blade running region of the blade unit 2.

The motor pinion 21 and the idle gear 17 are interposed between the motor 19 and the crank plate 15. However, the motor pinion 21 and the crank plate 15 may be driven by engaging with each other. In other words, any configuration may be adopted as long as the power of the motor 19 is decelerated and is transmitted to the crank plate 15.

The power of the motor 19 is decelerated in order to reduce a load on the motor 19 and to improve driving efficiency of the motor 19. In the shutter device 50 according to the present exemplary embodiment, the driving motor preferably has low inertia in order to quickly accelerate and to obtain a necessary curtain speed. Generally, when the motor has low inertia, a torque of the motor is low, driving efficiency may be deteriorated, and entire consumption current is increased. Accordingly, as described above, when the power of the motor 19 is moderately decelerated, a driving rate in a region where efficiency is high can be increased, and the consumption current by the motor 19 can be reduced.

Generally, the deceleration ratio of the gears is set to an indivisible value in order to avoid repetitive engagement of specific portions and to cause even abrasion. However, in the shutter device 50 according to the present exemplary embodiment, the deceleration ratio is set to an integral multiple. Due to the configuration, the same running start angle of the motor 19 can be set at start of running each time. Further, the gears engage with each other at the same positions from start to stop of the running. Accordingly, in the shutter device 50 according to the present exemplary embodiment, running of the blade unit 2 can be stabilized without varying the driving angle of the motor 19 and the engaging condition of the driving gears for each running, and in this way, variation in curtain speed and exposure can be reduced. In both of the cases where the motor pinion 21 and the crank plate 15 directly engage with each other, and the case where the idle gear 17 is interposed between the motor pinion 21 and the crank plate 15, the deceleration ratio of the gears is adjusted to an integral multiple.

(Driving Sequence of Shutter Device)

A driving sequence of the shutter device 50 is described. To actually drive the blade unit 2, it is necessary to grasp a current position of the slit formed portion 2f. As described above, the series of operation from the normal running to the return running during exposure and the phases thereof are as illustrated in FIG. 2. However, angle information when the slit formed portion 2f is at a main control target position is desirably grasped in advance. For example, a reference position O is acquired by the first position detector 23, and information about relative angles such as a running start position A, an original position B, an end position C, and a stop limit position D is acquired by the second position detector 25 in advance.

The running start position A is a position as a start reference when running of the blade unit 2 is started during the exposure. Accordingly, an optimum runup section to realize the predetermined running speed (curtain speed) of the blade unit 2 is set, and the running start position A is set within an acceleration section illustrated in FIG. 2 such that so-called light leakage to the opening 1a does not occur before running of the blade unit 2. Note that the motor 19 according to the present exemplary embodiment includes cogging torque, and it is sufficient for a shaft angle of the motor naturally stopped by the cogging torque to be coincident with the above-described running start position A. The original position B is a reference position for start of the exposure using the blade unit 2, and is set to a position near an end of the opening 1a (opening end) on a side on which the exposure is started (on the upstream side in the running direction of blade unit 2). The end position C is a reference position for the end of the exposure using the blade unit 2, and is set to a position near an end of the opening 1a (opening end) on a side on which the exposure is ended (on the downstream side in the running direction of blade unit 2). The stop limit position D is a stop limit position of the blade unit 2, and is set within a deceleration/stop section illustrated in FIG. 2 in order to prevent unnecessary exposure caused by release of light shielding of the opening 1a again after the end of the exposure.

As illustrated in FIG. 2, as the position of the slit formed portion 2f corresponding to the crank plate 15, a time after the running is started from the running start position A until the crank plate 15 passes through the end position C after passing through the original position B, corresponds to the curtain speed of the blade unit 2. The curtain speed is desirably controlled such that the running speed of the blade unit 2 in the running direction is made constant and is brought close to a target value (ideal value). As a method of controlling the curtain speed, a method of adjusting a curve (referred to as the running curve) representing the relationship between the running position of the blade and the running time is known. In the present exemplary embodiment, a rotary encoder (not illustrated) is provided as a detector for detecting rotation of an output shaft of the motor 19, and the rotation speed of the motor 19 and a displacement amount from an origin position can be determined.

In the present exemplary embodiment, an ideal running curve of the blade unit 2 is previously recorded in the imaging apparatus 100, and a difference with the curve during the normal running of the blade unit 2 output from the rotary encoder is detected. Further, the output of the motor 19 is adjusted to reduce the difference, so that the running curve of the blade unit 2 can be brought close to the ideal running curve.

The return running is an operation to return the driving member from the stop position to the running start position. Generally, it is necessary to reverse the rotation direction of the driving member by changing the rotation direction of the motor or the like. In contrast, in the present exemplary embodiment, it is sufficient to rotate the crank plate 15 in the direction which is the same as the direction of the normal running during the return running Therefore, the crank plate 15 can return to the running start position A by a small moving amount.

The return running is an operation that has no direct relationship to the main exposure. For this reason, it is unnecessary to control the running speed of the blade unit 2 and the running time for the return running with high accuracy. Accordingly, for example, the output of the motor 19 is reduced during the return running so as to largely reduce the consumption of current per the series of operations (one sequence) of the blade unit 2.

The case where the single blade unit 2 is operated has been described for simplification of description. This case is applicable to, for example, so-called electronic front curtain shutter driving in which the front curtain is controlled by the resetting (or reading) of a sensor. In the above-described shutter device 50, the blade unit 2 can function as the front curtain and a blade unit 3 can function as the rear curtain as illustrated in FIG. 4. In this case, the driving mechanism for each of the blade units is independently operable. The blade units and the driving mechanisms are symmetrically disposed, and each of the blade units is controlled so as to perform an operation based on the above-described mechanism. For example, the driving members and the blade units are disposed so as to be line symmetrical to a line that passes through a center of the opening 1a and is parallel to a long-side direction (longitudinal direction) of the opening 1a (i.e., line dividing the opening 1a into upper part and lower part).

(LV Continuous Imaging Sequence)

To perform an operation in which a so-called live view display is performed during continuous imaging (referred to as LV continuous imaging), it is necessary to prepare, as a state of the shutter device 50, a state where the opening 1a (LV phase) is opened between the two continuous main exposures (normal running) (between imaging frames). As described above, in the shutter device 50 according to the present exemplary embodiment, the two different blade units (front curtain and rear curtain) can be independently driven. Accordingly, it is possible to realize the state where the opening 1a is opened, by performing the return running of the blade unit on the rear curtain side after imaging (image) data of a certain frame is read. Further, the slit formed portion 2f of the blade unit (on the rear curtain side) is at the stop limit position D immediately after the imaging. Accordingly, the opening 1a can be quickly opened only by rotating the motor in the same direction to move the slit formed portion 2f to the running start position A.

To shift to a running standby state after end of the LV phase of the shutter device 50, the return running of the blade unit 2 corresponding to the front curtain is performed from the stop limit position D to the running start position A. By performing the above-described operation, both of the blade units for the front curtain and for the rear curtain are stayed at the running start position A, which enables an instant shift to a next imaging frame.

(State of Shutter Device During Power-Off)

A state of the shutter device 50 in a case where the imaging apparatus 100 is turned off is described. In the state where the imaging apparatus 100 is turned off, power is not supplied to the motor 19 of the shutter device 50.

The above-described leverage crank mechanism reciprocates the driving member 11 by rotating the crank plate 15. On the other hand, it is possible to operate the crank plate 15 by applying force to the driving member 11. In a case where the crank plate 15 in a stopped state is operated, a load for the operation of the crank plate 15 is varied depending on the position of the driving member 11. For example, in a case where the driving member 11 is positioned in a middle of the reciprocation orbit, the crank plate 15 is operated by a small load. In contrast, in a case where the driving member 11 is positioned near a top center or a bottom center of the reciprocation, a large load is necessary to operate the crank plate 15. In other words, in the case where the driving member 11 is positioned near the top center or the bottom center of the reciprocation, the driving member 11 is not easily moved unless force is applied from the crank plate 15 side. Because of the characteristics, even in a case where the imaging apparatus 100 is turned off, the opened state and the light shielding state (closed state) of the opening 1a by the blade unit 2 can be maintained.

For example, to maintain the opening 1a in the opened state when the imaging apparatus 100 is turned off, the motor 19 is driven in response to an instruction to turn off the imaging apparatus 100, and the imaging apparatus 100 is turned off after the blade unit 2 is moved to the position where the opening 1a is opened. For example, to maintain the opening 1a in the light shielding state when the imaging apparatus 100 is turned off, the motor 19 is driven in response to the instruction to turn off the imaging apparatus 100, and the imaging apparatus 100 is turned off after the opening 1a is put into the light shielding state by the blade unit 2. With this configuration, the shutter device 50 according to the present exemplary embodiment can easily maintain the light shielding state or the opened state by the blade unit 2 in the state where the imaging apparatus 100 is turned off.

As described above, since the shutter device 50 according to the present exemplary embodiment adopts the leverage crank mechanism, it is possible to prevent the loss of flexibility in the adjustment of the curtain speed and the running curve without requiring a driving member such as a driving spring and another mechanism such as a blade suction holding mechanism.

A shutter device 60 according to a second exemplary embodiment of the present disclosure is described. The shutter device 60 is different from the shutter device 50 described in the above-described first exemplary embodiment in that the shutter device 60 includes a restriction member 31. Other than that, the shutter device 60 according to the present exemplary embodiment has the same configuration as the configuration of the shutter device 50 according to the first exemplary embodiment, and the same names and the same reference numerals of the portions are used.

Figure 6:
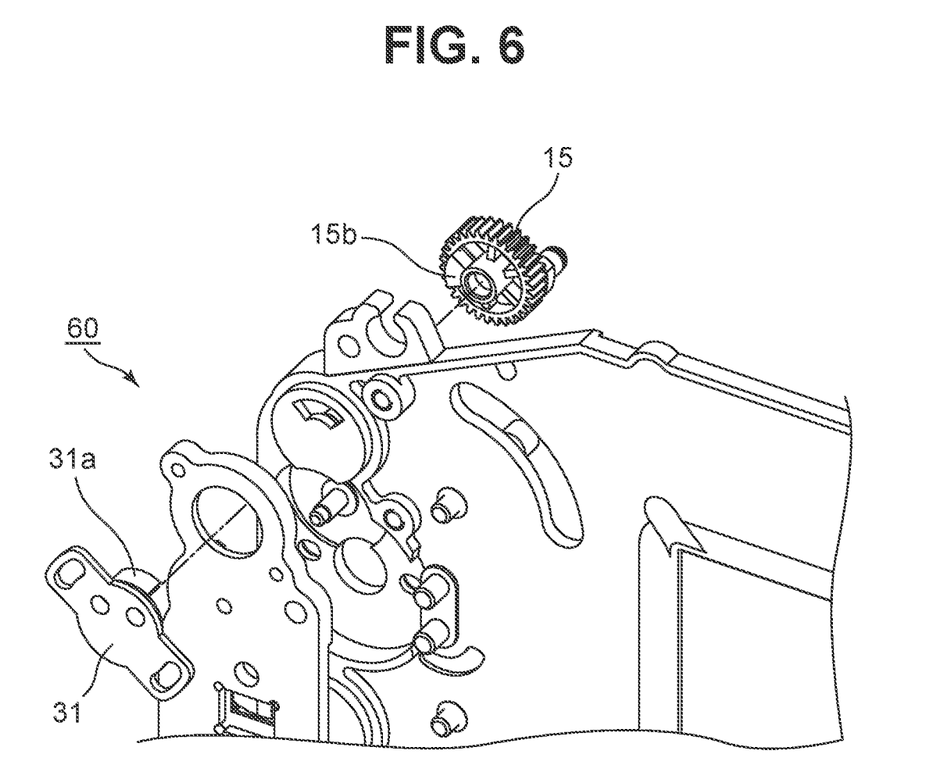
FIG. 6 is a partial appearance perspective view of a driving mechanism of a blade unit according to a second exemplary embodiment of the present disclosure.

In the present exemplary embodiment, to prevent light leakage before the normal running of the blade unit 2 and unnecessary re-exposure after the normal running, the restriction member 31 restricts movement of the crank plate 15 within a predetermined range. FIG. 6 is a partial appearance perspective view of a driving mechanism of the blade unit 2 according to the second exemplary embodiment of the present disclosure. As illustrated in FIG. 6, a protrusion 31a of the restriction member 31 is disposed so as to abut on a protrusion 15b of the crank plate 15 in the rotation direction of the crank plate 15. The restriction member 31 is disposed such that the rotation phase of the crank plate 15 at which the protrusion 15b and the protrusion 31a abut on each other is within a range corresponding to the return running in FIG. 2. In other words, in a case where the protrusion 15b and the protrusion 31a interfere with each other, the slit formed portion 2f is not positioned between the stop limit position D and the running start position A, but the sections for normal running, acceleration, and deceleration can be secured as in the above-described first exemplary embodiment. With this configuration, it is possible to prevent occurrence of light leakage and re-exposure caused by unexpected rotation of the crank plate 15.

On the other hand, in the present exemplary embodiment, the series of rotation from the normal running to the return running of the blade unit 2 cannot be completed by rotating the crank plate 15 in the same direction, unlike the above-described first exemplary embodiment. More specifically, in the shutter device 60 according to the present exemplary embodiment, after the normal running of the blade unit 2, it is necessary to reverse rotate the crank plate 15 by rotating the motor 19 in a direction opposite to the rotation direction of the normal running, to return the crank plate 15 to the running start position A.

In the shutter device 60 according to the present exemplary embodiment, it is necessary to reverse rotate the motor 19 and the crank plate 15 during the return running. For this reason, the time necessary for the return running is long as compared with the shutter device 50 according to the above-described first exemplary embodiment. However, generally, the return running of the shutter device does not require highly accurate positional control and is performable by a low output of the motor, and the time available to complete the operation is large. Accordingly, influence on the object imaging operation using the shutter device 60 is small. In other words, the shutter device 60 according to the present exemplary embodiment can prevent the loss of flexibility in the adjustment of the curtain speed and the running curve while preventing unnecessary exposure.

In terms of state maintenance of the blade unit 2 when the imaging apparatus 100 is turned off, the shutter device 60 is different from the shutter device 50 in that the shutter device 60 can prevent movement of the driving member 11 by external force even when the driving member 11 is separated from the position near each of the centers in the reciprocation. More specifically, in the shutter device 60, the motor 19 serves as a driving source that includes an iron core in an armature and includes cogging torque. Further, a decelerator such as the idle gear 17 is interposed between the motor 19 and the crank plate 15. As a result, to move the crank plate 15 from the driving member 11 side, it is necessary to increase the speed, and force obtained by multiplying the cogging torque of the motor 19 by a speed increase ratio is necessary. When the shutter device 60 has this configuration, the driving member 11 is hardly moved by the external force toward the driving member 11 even at the position shifted from each of the centers in the reciprocation of the driving member 11, as compared with the shutter device 50 according to the first exemplary embodiment. For example, movement of the driving member 11 by the external force toward the driving member 11 can be limited within a range from the vicinities of both centers in the reciprocation of the driving member 11 to the position abutting on the restriction member 31. In other words, the shutter device 60 can maintain, as the state of the blade unit 2 when the imaging apparatus 100 is turned off, the state where the opening 1a is opened and the state where the opening 1a is closed even when positional accuracy relating to the control of the driving members is low as compared with the first exemplary embodiment.

Although the preferred exemplary embodiments of the present disclosure are described above, the present disclosure is not limited to these exemplary embodiments, and various modifications and alternations can be made within the spirit and scope of the present disclosure. For example, in each of the above-described exemplary embodiments, the configuration adopting the leverage crank mechanism as the driving mechanism for adjusting the exposure amount in the object imaging relating to the shutter device is described. However, the configuration is not limited thereto.

For example, any of the above-described shutter devices may be applied to a light shielding device not involved in exposure amount adjustment in the object imaging. In this case, the above-described shutter device may be used as a light shielding device that protects an imaging sensor of the imaging apparatus 100 from sunlight and dust while an electronic shutter function is used to adjust the exposure amount in the object imaging.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Applications No. 2021-108060, filed Jun. 29, 2021, and No. 2021-108061, filed Jun. 29, 2021, which are hereby incorporated by reference herein in their entirety.

What is claimed is:

1. A shutter device comprising:
a base plate including an opening;
a blade unit configured to switch a state of the opening between a closed state and an opened state;
a driving member attached to the blade unit and configured to drive the blade unit;
a motor;
a decelerator configured to decelerate power from the motor;
a first connector engaged with the decelerator;
a second connector having one end attached to the driving member and another end attached to the first connector;
a first position detector configured to detect passage through a predetermined position in a moving locus of the driving member or the first connector; and
a second position detector configured to detect a relative difference from the first position detector,
wherein the blade unit switches the state of the opening from the closed state to the opened state by continuous rotation of the first connector in a first direction, and
wherein driving of the motor is controlled based on results of the detection by the first position detector and the second position detector.

2. The shutter device according to claim 1, wherein a deceleration ratio of the decelerator is an integral multiple.

3. The shutter device according to claim 1, wherein the blade unit switches the state of the opening from the closed state to the open state and back to the closed state again through normal running when imaging an object, by the continuous rotation of the first connector in the first direction.

4. The shutter device according to claim 3, wherein the blade unit performs operation to continuously image an object only by the continuous rotation of the first connector in the first direction.

5. The shutter device according to claim 3, further comprising a restriction member configured to restrict a rotation angle of the first connector,
wherein the restriction member restricts movement of the first connector in the first direction to switch the state of the opening to the opened state from the closed state after the normal running of the blade unit.

6. The shutter device according to claim 1,
wherein the first connector is a rotatable crank,
wherein the second connector is an arm that moves on a predetermined locus by rotation of the first connector, and
wherein the driving member reciprocates with movement of the second connector.

7. The shutter device according to claim 6, wherein the first position detector is disposed at a position different from a position near a center in reciprocation of the driving member.

8. The shutter device according to claim 1, wherein the second position detector detects a rotation angle of the motor.

9. The shutter device according to claim 1, wherein the motor includes cogging torque, and a shaft angle naturally stopped by the cogging torque is coincident with a running start position.

10. An imaging apparatus comprising:
the shutter device according to claim 1.

* * * * *